(12) United States Patent
Gardner

(10) Patent No.: US 8,708,592 B1
(45) Date of Patent: Apr. 29, 2014

(54) ADJUSTABLE TREE STAND FRAME

(71) Applicant: Christopher Norman Gardner, Pensacola, FL (US)

(72) Inventor: Christopher Norman Gardner, Pensacola, FL (US)

( * ) Notice: Subject to any disclaimer, the term of this patent is extended or adjusted under 35 U.S.C. 154(b) by 0 days.

(21) Appl. No.: 13/792,162

(22) Filed: Mar. 10, 2013

(51) Int. Cl.
*F16D 1/12* (2006.01)

(52) U.S. Cl.
USPC ............................... 403/53; 403/93; 182/187

(58) Field of Classification Search
USPC ............ 403/53, 57–59, 61, 91–95, 103, 116; 182/187, 188; 248/291.1, 292.12, 248/292.13, 292.14
See application file for complete search history.

(56) References Cited

U.S. PATENT DOCUMENTS

| | | | | |
|---|---|---|---|---|
| 3,944,279 | A * | 3/1976 | Blackstock et al. | 182/187 |
| 4,819,763 | A * | 4/1989 | Grote | 182/187 |
| 5,848,666 | A * | 12/1998 | Woodall et al. | 182/187 |
| 5,927,437 | A * | 7/1999 | Fast | 182/187 |
| 6,367,585 | B1 * | 4/2002 | Fast | 182/187 |
| 6,571,916 | B1 * | 6/2003 | Swanson | 182/187 |
| 7,882,931 | B2 * | 2/2011 | D'Acquisto | 182/187 |
| 8,230,972 | B2 * | 7/2012 | Johnson | 182/187 |
| 2008/0169156 | A1 * | 7/2008 | Leishman et al. | 182/187 |

* cited by examiner

*Primary Examiner* — Michael P Ferguson
*Assistant Examiner* — Daniel Wiley
(74) *Attorney, Agent, or Firm* — Peter Loffler

(57) ABSTRACT

An adjustable tree stand frame has a housing attached to a tree with a spindle rotatably disposed within the housing. One or more spring loaded pins are removably receivable within openings on an outer periphery of the spindle such that when so received within an opening, spindle rotation is prevented. A frame is pivotally attached to the spindle and uses a threaded shaft and a receiver to pivot the frame back and forth with respect to the spindle.

8 Claims, 6 Drawing Sheets

ADJUSTABLE TREE STAND FRAME

BACKGROUND OF THE INVENTION

1. Field of the Invention

The present invention relates to a tree stand frame that attaches to a tree allowing a tree stand to be attached to the frame. The frame allows the tree stand to be leveled by a user on two different axis, both left and right and back and forth with respect to the tree.

2. Background of the Prior Art

Tree stands are very useful in the sport of hunting. Being located up in a tree, a tree stand elevates a hunter, allowing him or her to see over intervening brush and vegetation that might otherwise block the hunter's view of approaching game. This gives the hunter a better vantage point from which to prosecute the hunt.

As the name strongly implies and excluding box stands and tripod stands, tree stands are located up in and attached to a tree. The tree is selected as is the desired height and the hunter installs the stand. While most hunters are quite adept at installing various tree stands, modern tree stand installation is not without its drawbacks. Chief among the drawbacks is the fact that very few trees grow perfectly straight. As such, in order to be both safe and comfortable on the tree stand, the hunter must level the tree stand prior to use. This can get quite problematic as the hunter may be twenty to thirty feet or more up in the tree while attempting to adjust the securement cables or metal brackets that secure the stand to the tree all while making sure the hunter does not fall.

To address this problem, various leveling systems have been proposed to help a hunter level the tree stand. Such devices, which come in various architectures and work with varying degrees of efficiency, suffer from drawbacks of their own. Many prior art leveling systems are complex in both design and construction so as to make such devices expensive to manufacture, obtain, and maintain. Some devices are unusually difficult to use, especially when up in a tree. Still others require tools, sometimes specialized tools, adding to the load the hunter must carry during the hunt.

What is needed is a device that allows a hunter to level a tree stand that overcomes the above mentioned shortcomings found in the art. Specifically, such a device must allow a hunter, working high up in a tree, to be able easily adjust the tree stand in short order without the need for tools. Such a device must be relatively simple in design and construction so that it is relatively inexpensive to produce as well as to maintain.

SUMMARY OF THE INVENTION

The adjustable tree stand frame of the present invention addresses the aforementioned needs in the art by providing a system onto which a tree stand is attached, the frame allowing the hunter to quickly and easily level the tree stand attached thereto without the need to have on hand any tools to operate the present invention. The adjustable tree stand frame is of relatively simple design and construction and is produced using standard manufacturing techniques so that the invention is relatively inexpensive to produce so as to be economically attractive to consumers for this type of product.

The adjustable tree stand frame of the present invention is comprised of a housing. A spindle is rotatably disposed within the housing and has a series of openings on an outer periphery thereof. At least one pin is received by the housing and is removably receivable within a respective one of the series of openings of the spindle such that when the pin is disposed within the respective one opening, the spindle is prevented from rotating with respect to the housing and when the pin is not disposed within the respective one opening, the spindle is free to rotate within the housing. A frame member is pivotally connected to the spindle such that when the spindle rotates, the frame rotates and thereby allowing leveling on one axis. A female receiver is connected to the housing. A threaded shaft is attached to the frame member and is threadably received within the receiver such that rotation of the receiver either draws a portion of the threaded shaft into the receiver or pays out a portion of the threaded shaft out of the receiver, each causing the frame member to pivot with respect to the spindle and thereby allowing leveling on a second axis. The at least one pin is spring loaded. The housing has a curved channel such that whenever the spindle rotates, the receiver slides within the channel. A bracket is attached to the housing. The bracket has an arcuate shaped cutout with an edge of the cutout having gripping teeth for gripping into a tree. The frame member comprises a stand plate that is pivotally attached to the spindle, a main shaft that connects the stand plate to a platform, and a central shaft connected to the platform and to the threaded shaft. The platform may be bat wing shaped.

BRIEF DESCRIPTION OF THE DRAWINGS

Similar reference numerals refer to similar parts throughout the several views of the drawings.

DESCRIPTION OF THE PREFERRED EMBODIMENT

Figure 1:
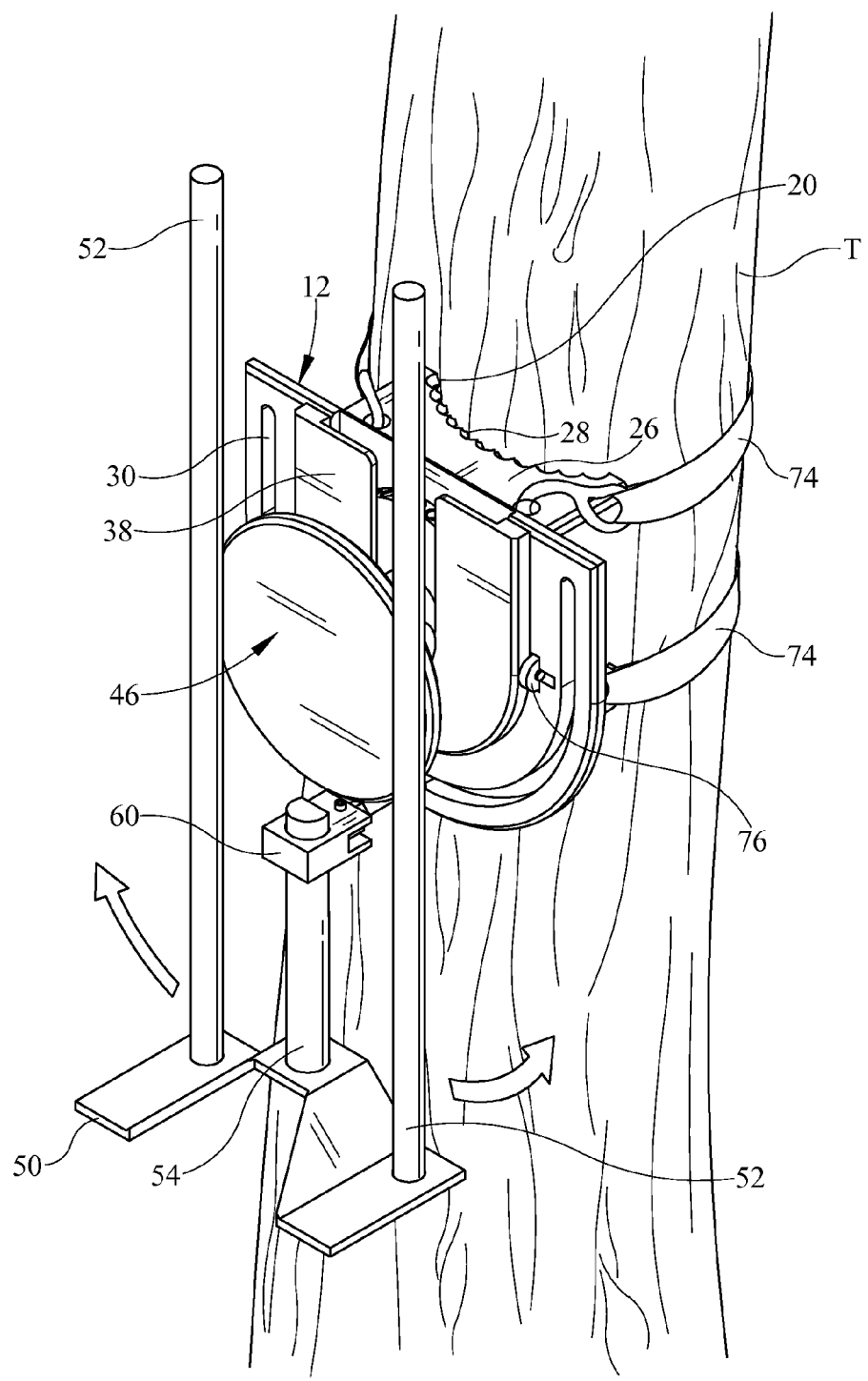
FIG. 1 is an environmental view of the adjustable tree stand frame of the present invention secured to a tree.
Figure 2:
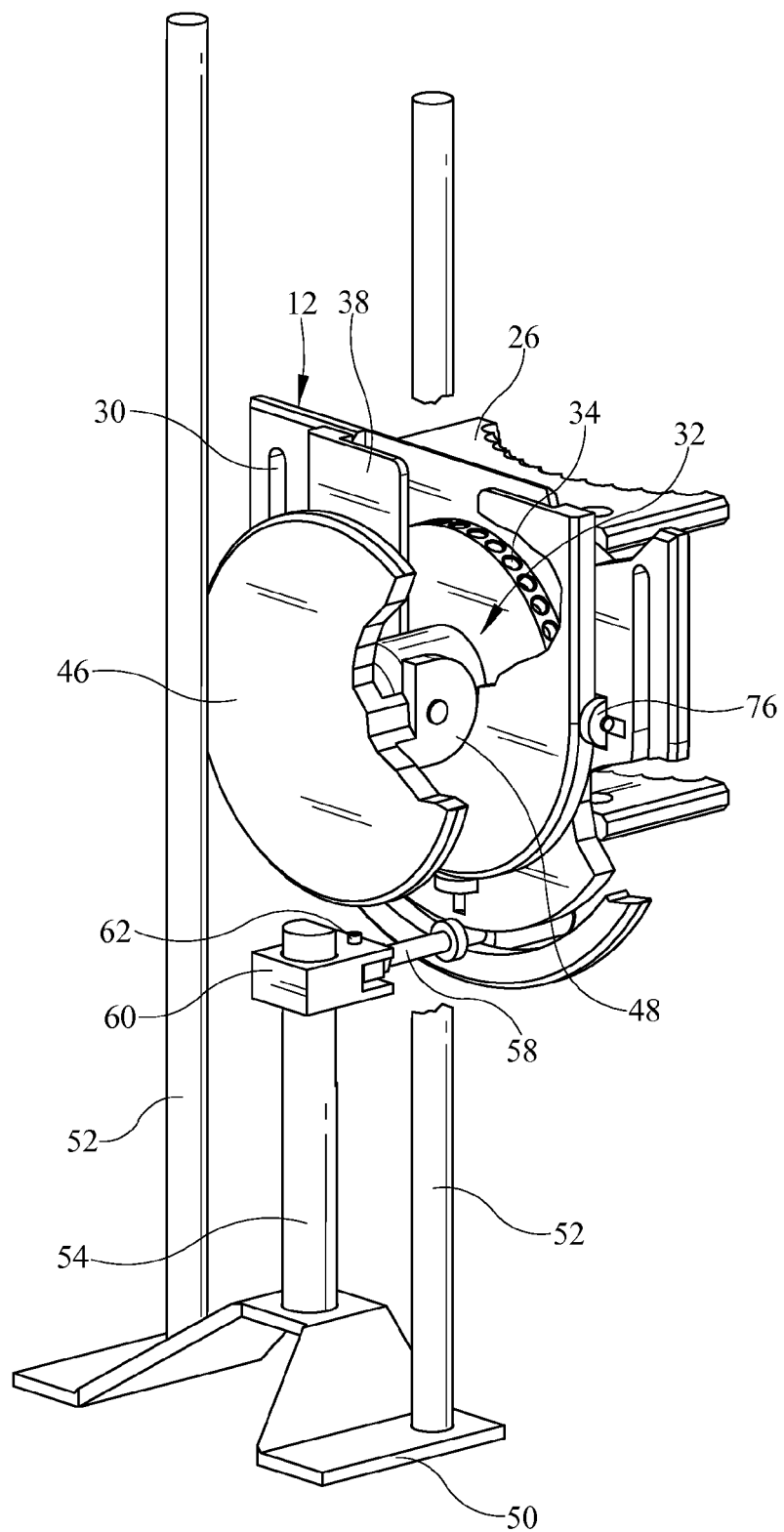
FIG. 2 is a front perspective view, partially cut away, of the adjustable tree stand frame.
Figure 3:
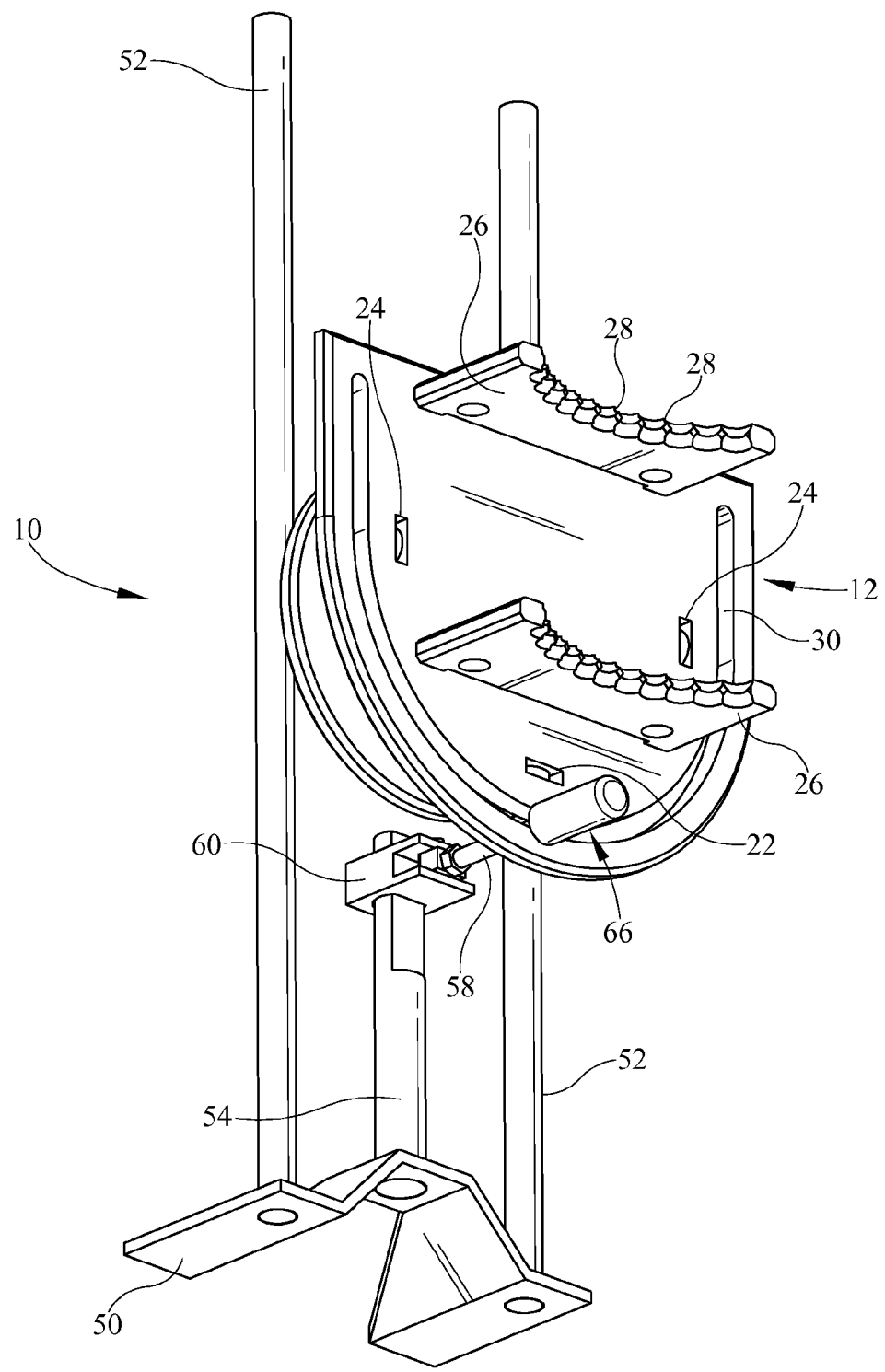
FIG. 3 is a rear perspective view of the adjustable tree stand frame.
Figure 4:
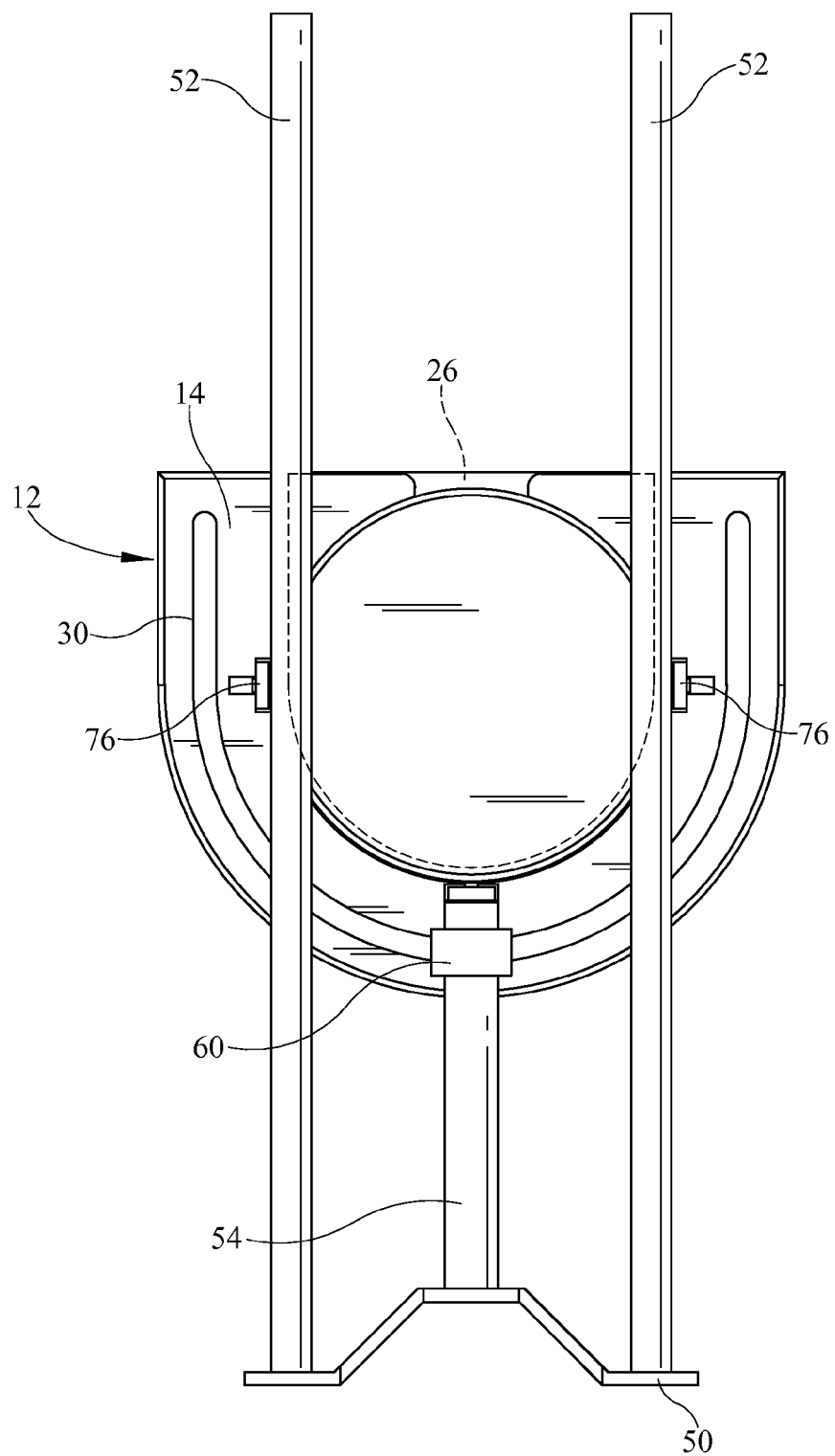
FIG. 4 is a front elevation view of the adjustable tree stand frame.
Figure 5:
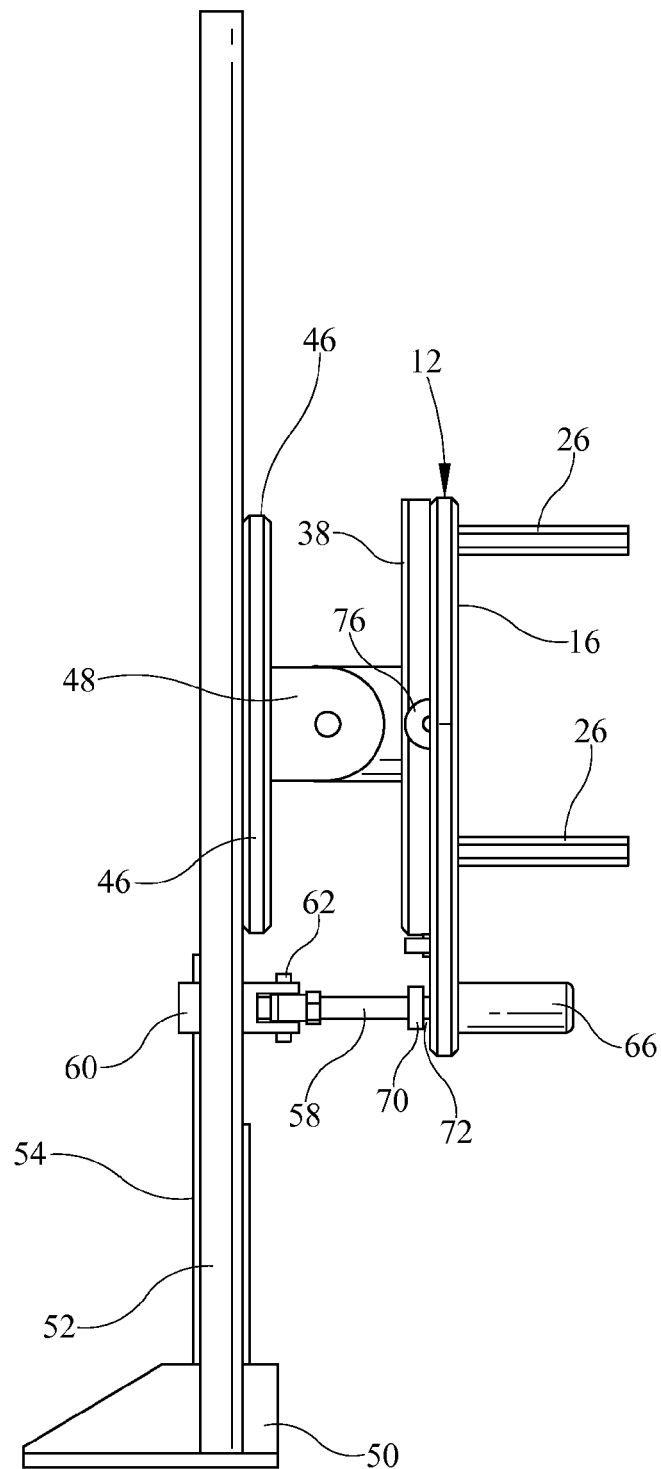
FIG. 5 is a side elevation view of the adjustable tree stand frame.
Figure 6:
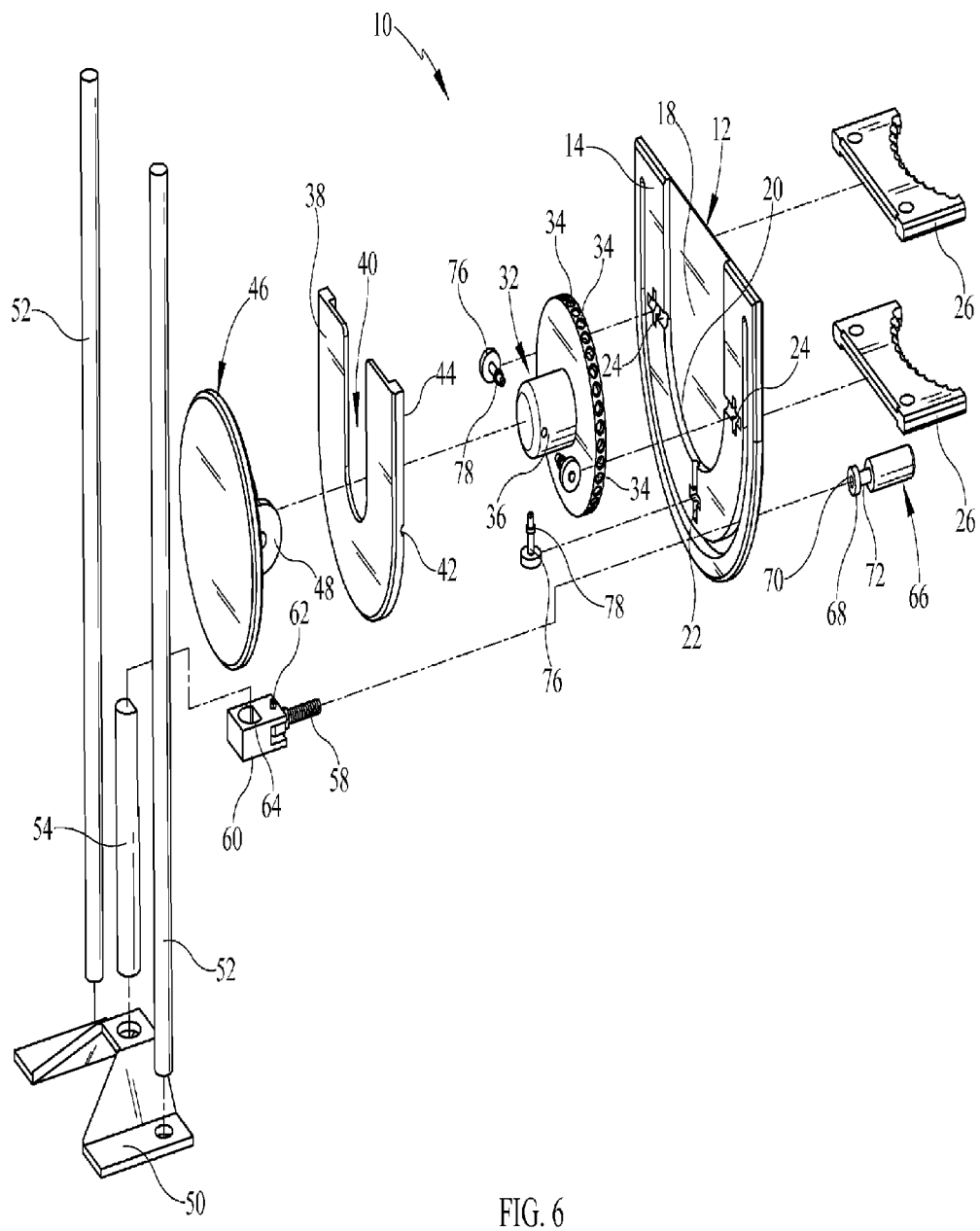
FIG. 6 is an exploded perspective view of the adjustable tree stand frame.

Referring now to the drawings, it is seen that the adjustable tree stand frame of the present invention, generally denoted by reference numeral 10, is comprised of a back plate 12 having a front surface 14 and a rear surface 16. The front surface 14 of the back plate 12 has a generally U-shaped main depression 18 therein with a rounded bottom 20. Located on the front surface 14 at the bottom of the rounded bottom 20 just below and at the edge of the main depression 18 is a bottom pin depression 22 while two additional side pin depressions 24 are located at the edge of the main depression 18, one side pin depression 24 on each side of the bottom pin depression 22 and each located 90 degrees around the curve of the rounded bottom 20 of the main depression 18 with respect to the bottom pin depression 22. Attached to the rear surface 16 of the back plate 12 is a pair of securement brackets 26, each having a arcuate cut having multiple gripping teeth 28 on the outer edge thereof. The securement brackets 26 can be welded to the back plate 12 or can be bolted thereto in appropriate fashion for ease of disassembly and transport of the adjustable tree stand frame 10. A U-shaped main channel 30 is located on the back plate 12 such that the main depression 18 is substantially bounded by the main channel 30 and the bottom pin depression 22 and the side pin depressions 24 are all located between the main channel 30 and the main depression 18.

A spindle 32 has a series of openings 34 located around its entire outer periphery. A shaft 36 extends outwardly from the center of the spindle 32. The spindle 32 seats within the main depression 18 and is free to rotate therein.

A front plate 38 has an opening 40 such that the front plate 38 is secured to the back plate 12 in any appropriate fashion (welding, bolts, etc.,), in order to provide a housing in combination with the back plate 12 and thereby secure the spindle 32 within the main depression 18 such that the shaft 36 of the spindle 32 passes through the opening 40 of the front plate 38. The front plate 38 is dimensioned so as not to overlay the channel 30 of the back plate 12 when the front plate 38 is attached to the back plate 12. Cutouts 42 (only one illustrated) are provided on the attachment flange 44 of the front plate 38. The spindle 32 is free to rotate within the main depression 18 within the housing created by the front plate 38 and back plate 12.

A stand plate 46 has a pair of attachment flanges 48 (only one illustrated) that are each boltably secured to the shaft 36 of the spindle 32 allowing the stand plate 46 to pivot with respect to the spindle 32.

A generally bat-wing support platform 50 has a pair of main shafts 52 extending upwardly therefrom while a shorter central shaft 54 extends upwardly from the support platform 50 and is located between the main shafts 52. The main shafts 52 and the bottom of the central shaft 54 are each secured to the platform 50 and the stand plate 46 in appropriate fashion (welding, bolts, etc.,), while the upper section of the central shaft 54 is adjustably secured to the back plate 12 by an adjustment system 56. As seen, the adjustment system 56 comprises a threaded shaft 58 that is attached to a housing 60 via a pin 62, the shaft 58 extending outwardly from the housing 60. The housing 60 has an opening 64 such that the central shaft 54 is impaled by the housing 60 through this opening 64. A female receiver 66 has a threaded opening 68 that threadably receives the shaft 58 therein. As seen, the female receiver 66 has an end cap 70 on its opening end such that an encircling channel 72 is defined just below the end cap 70. The female receiver 66 is attached to the back plate 12 such that the female receiver's encircling channel 72 seats with the back plate's main channel 30 with the main portion of the female receiver 66 extending rearwardly from the back plate 12 and the end cap 70 located on the opposing side of the back plate 12 in order to maintain the female receiver 66 secured to the back plate 12. Once the female receiver 66 is properly positioned with respect to the back plate 12, the end cap 70 is welded to the remainder of the female receiver 66 (although it can also be threadably secured thereto). The female receiver 66 can slide within the main channel 30 of the back plate 12. The shaft 58 of the adjustment system 56 is threadably received within the female receiver 66.

In order to use the adjustable tree stand frame 10 of the present invention, the adjustable tree stand frame 10 is attached to a tree T such that the securement brackets 26 are attached to the tree T with their teeth 28 helping grip the tree T. Appropriate cables 74 are used to encircle the tree T and secure the adjustable tree stand frame 10 to the tree T in the typical way. A desired seat and or stand (neither illustrated) are attached to the adjustable tree stand frame 10, namely to the main shafts 52 and central shaft 54, the platform 50, and/or the stand plate 46 in desired fashion.

In order to level the adjustable tree stand frame 10, and thus any seat and stand attached thereto, the stand plate 46 is rotated as desired, rotation of the stand plate 46 causing rotation of the spindle 32. When the proper amount rotation of the stand plate 45 is achieved, the spindle 32 is locked into place using a series of spring loaded pins 76 that are each seated within one of the pin depressions 22 and 24. In a normally relaxed state, each pin 76 biases toward the spindle 32 so that when no further rotation of the spindle 32 is desired, each pin 76 is urged into an opening 34 on the spindle 32 that has aligned with the particular pin 76, and as the pins 76 seat within their respective pin depressions 22 and 24, further spindle 32 rotation is prevented and the spindle 32 is locked into place, the spring (not illustrated) of each pin 76 biasing the pin 76 into its opening 34. When rotation of the spindle 32 is desired, each pin 76 is pulled, against the bias of its spring, out from its opening 34, unlocking the spindle 32 and allowing the spindle 32, and thus the stand pipe 46 and the various implements attached thereto, to rotate, and thereafter the pins 76 are once again urged into an opening 34 on the spindle 32 with which a particular pin 76 has then aligned. As seen, each pin 76 has a limit ring 78 encircling the shaft of the pin 76 so that when the front plate 38 is secured to the back plate 32, the cutouts 42 on the front plate 38 straddle their respective pin 76, but the cutouts 42 are too small to let the limit ring 78 pass therethrough, holding the pins 78 in their respective pin depressions 22 and 24. Spindle 32 rotation (the spindle 32 can rotate 360 degrees, although the female receiver 66 traveling in the main channel 30 of the back plate 12 whenever the spindle 32 is being rotated, prevents a full 360 degrees of rotation of the spindle 32, however, this is not a limiting factor for the invention as such extreme spindle rotation 32 would never be needed) adjusts side to side (with respect to the tree T) leveling of the adjustable tree stand frame 10. In order to achieve front and back leveling, the female receiver 66 is rotated in order to either draw in or pay out a portion of the shaft 58 of the adjustment system 54 within the female receiver 66. As the stand plate 46 is pivotally attached to the spindle 32, such back and forth movement of the main frame elements (stand plate 46, platform 50, main shafts 52 and central shaft 54) is possible.

The various components of the adjustable tree stand frame 10 are made from an appropriate material such as aluminum, stainless steel, etc., or a combination thereof. The various components are attached together in appropriate fashion, such as welding or bolting, or a combination thereof, except where noted.

While the invention has been particularly shown and described with reference to an embodiment thereof, it will be appreciated by those skilled in the art that various changes in form and detail may be made without departing from the spirit and scope of the invention.

I claim:

1. An adjustable frame configured to connect to a tree, the frame comprising:
   a housing, the housing comprising a back plate having opposing front and rear sides, the rear side comprising at least two brackets configured to connect the back plate to an outer surface of the tree, the front side including a front plate attached thereto, the front plate and back plate defining an opening therebetween, and wherein the back plate further comprises a generally U-shaped through-channel formed in a lower portion of the back plate below the front plate;
   a spindle, the spindle comprising:
   a first annular portion rotatably disposed within the opening of the housing, the first annular portion defining a rotation axis passing through a center thereof and extending substantially normal to the back plate, the first annular portion further having a series of openings on an outer periphery thereof;

a second annular portion integral with and extending from a center of the first annular portion, the second annular portion passing through an aperture in the front plate, the second annular portion comprising a pivot pin located at a distal end thereof, the pivot in defining a pivot axis, the pivot axis extending perpendicular to the rotation axis and parallel to the back plate; and a stand plate, the stand plate comprising opposing front and rear surfaces, wherein an attachment flange extends from a central portion of the rear surface of the stand plate, the attachment flange being pivotally connected to the pivot pin;

at least one pin disposed within the housing and removably receivable within a respective one of the series of openings in the first annular portion, such that when the at least one pin is disposed within the respective one opening the spindle is prevented from rotating with respect to the housing and when the pin is not disposed within the respective one opening, the spindle is free to rotate within the housing about the rotation axis;

a frame member connected to the stand plate such that when the spindle rotates about the rotation axis, the frame member rotates about the rotation axis;

a receiver slidably engaged within the through-channel in the back plate of the housing, the receiver including a female threaded opening; and a threaded shaft attached to the frame member at a location below the stand plate and threadably received within the female threaded opening such that rotation of the receiver about the threaded shaft either draws a portion of the threaded shaft into the receiver, thereby pivoting the frame member about the pivot axis in a first direction, or pays out a portion of the threaded shaft out of the receiver thereby causing the frame member to pivot about the pivot axis in a second direction, opposite the first direction.

2. The adjustable frame as in claim 1 wherein the at least one pin is spring loaded.

3. The adjustable frame as in claim 2, wherein the brackets have an arcuate shaped cutout, an edge of the cutout having a series of gripping teeth.

4. The adjustable frame as in claim 3 wherein the frame member comprises:
   a main shaft connecting the stand plate to a platform; and
   a central shaft connecting the platform with the threaded shaft.

5. The adjustable frame as in claim 4 wherein the platform is bat wing shaped.

6. The adjustable frame as in claim 1, wherein the brackets have an arcuate shaped cutout, an edge of the cutout having a series of gripping teeth.

7. The adjustable frame as in claim 1 wherein the frame member comprises:
   a main shaft connecting the stand plate to a platform; and
   a central shaft connecting the platform with the threaded shaft.

8. The adjustable frame as in claim 7 wherein the platform is bat wing shaped.

* * * * *